(12) United States Patent
Chung (10) Patent No.: US 9,091,897 B2
(45) Date of Patent: Jul. 28, 2015

(54) TRANSMITTANCE CONTROL METHOD OF ELECTROCHROMIC COMPONENT

(71) Applicant: TINTABLE SMART MATERIAL CO., LTD., Tainan (TW)

(72) Inventor: Yi-Wen Chung, Tainan (TW)

(73) Assignee: Tintable Smart Material Co., Ltd., Tainan (TW)

( * ) Notice: Subject to any disclaimer, the term of this patent is extended or adjusted under 35 U.S.C. 154(b) by 251 days.

(21) Appl. No.: 13/844,855

(22) Filed: Mar. 16, 2013

(65) Prior Publication Data

US 2014/0268285 A1     Sep. 18, 2014

(51) Int. Cl.
*G02F 1/153*   (2006.01)
*G02F 1/163*   (2006.01)
*G02F 1/15*    (2006.01)
*G02F 1/161*   (2006.01)
*G02F 1/155*   (2006.01)

(52) U.S. Cl.
CPC . *G02F 1/163* (2013.01); *G02F 1/15* (2013.01); *G02F 1/155* (2013.01); *G02F 1/1508* (2013.01); *G02F 1/1521* (2013.01); *G02F 1/1533* (2013.01); *G02F 1/161* (2013.01); *G02F 2001/1512* (2013.01); *G02F 2001/1515* (2013.01); *G02F 2001/1519* (2013.01)

(58) Field of Classification Search
CPC ....... G02F 1/163; G02F 1/155; G02F 1/1533; G02F 1/15; G02F 1/161; G02F 2001/1515; G02F 1/1508; G02F 1/1521; G02F 2001/1512; G02F 2001/1519
USPC ......................................................... 359/275
See application file for complete search history.

(56) References Cited

U.S. PATENT DOCUMENTS

| | | | |
|---|---|---|---|
| 5,402,144 A * | 3/1995 | Ripoche | 359/265 |
| 6,496,295 B1 * | 12/2002 | Wittwer et al. | 359/273 |
| 6,791,737 B2 * | 9/2004 | Giron | 359/265 |
| 7,586,663 B1 * | 9/2009 | Radmard et al. | 359/265 |

\* cited by examiner

*Primary Examiner* — Evelyn A Lester
(74) *Attorney, Agent, or Firm* — Rosenberg, Klein & Lee (57) ABSTRACT

A transmittance control method of electrochromic element, mainly comprising the following step: firstly, a total current flux input required is obtained by adding current value of each second together by the relationship between different current value and different rate of change of the electrochromic element obtained in terms of the same transmittance and different input voltages, then the total current flux for fixed transmittance is input into the electrochromic element in usage so as to achieve a transmittance of fixed value. In this manner, the electrochromic element can quickly achieve a transmittance of fixed value in precise manner, without repeated adjustment. Further, there is not such case happened as to influence the accuracy of its transmittance even after aging time lapse.

4 Claims, 11 Drawing Sheets

TRANSMITTANCE CONTROL METHOD OF ELECTROCHROMIC COMPONENT

BACKGROUND OF THE INVENTION

1. Field of the Invention

The present invention relates to a transmittance control method of electrochromic element, particularly to a transmittance control method of electrochromic element, whereby the electrochromic element can quickly achieve a transmittance of fixed value precisely without repeated adjustment, and there is not such case happened as to influence the accuracy of its transmittance even after aging time lapse.

2. Brief Description of Prior Art

Accompanying with the rapid progress of science and technology, a variety of specific materials have been developed, among which, electrochromic element refers to a component of reversibly changing color when voltage is applied. For example, the electrochromic element changes from transparent colorless to colored state when activated. Electrochromic element is basically a multi-layer electrochemical device in its structure. When a voltage is applied to the electrochromic element, the substances within it conduct reversible oxidation or reduction reaction which leads to a phenomena of color change. The electrochromic element can be used in our daily life. If sunshine is too strong in the outside or if internal privacy is desired, this technology can be applied to change glass transmittance.

Figure 10:
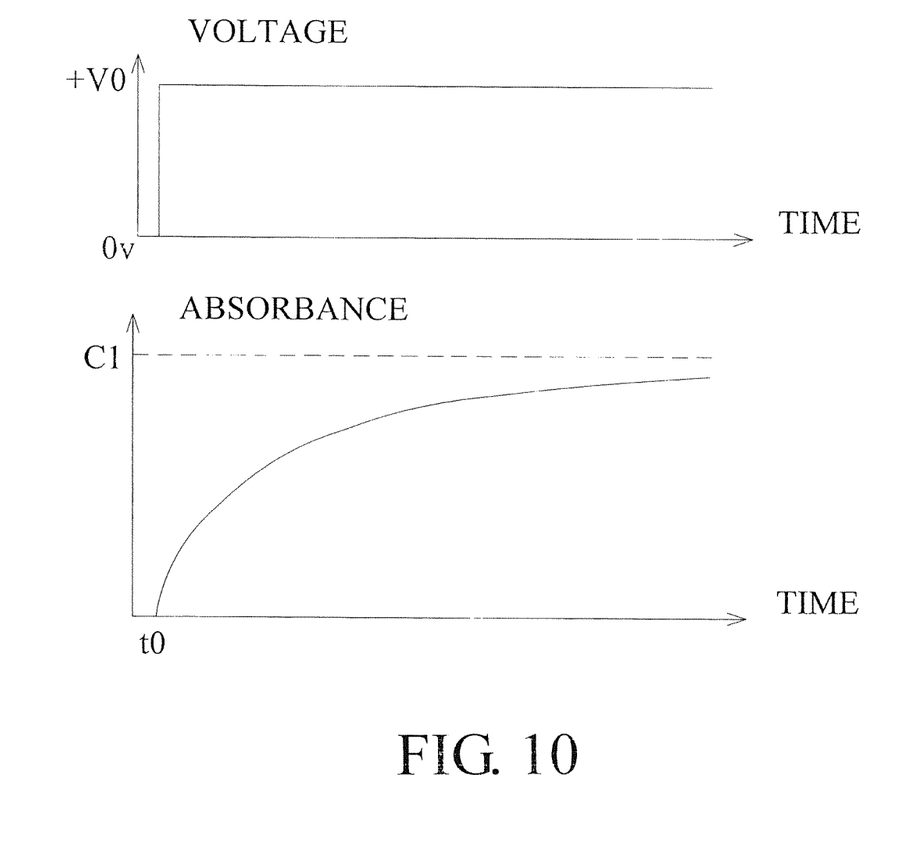
FIG. 10 is a schematic view showing the oxidation reaction of an electrochromic element.
Figure 11:
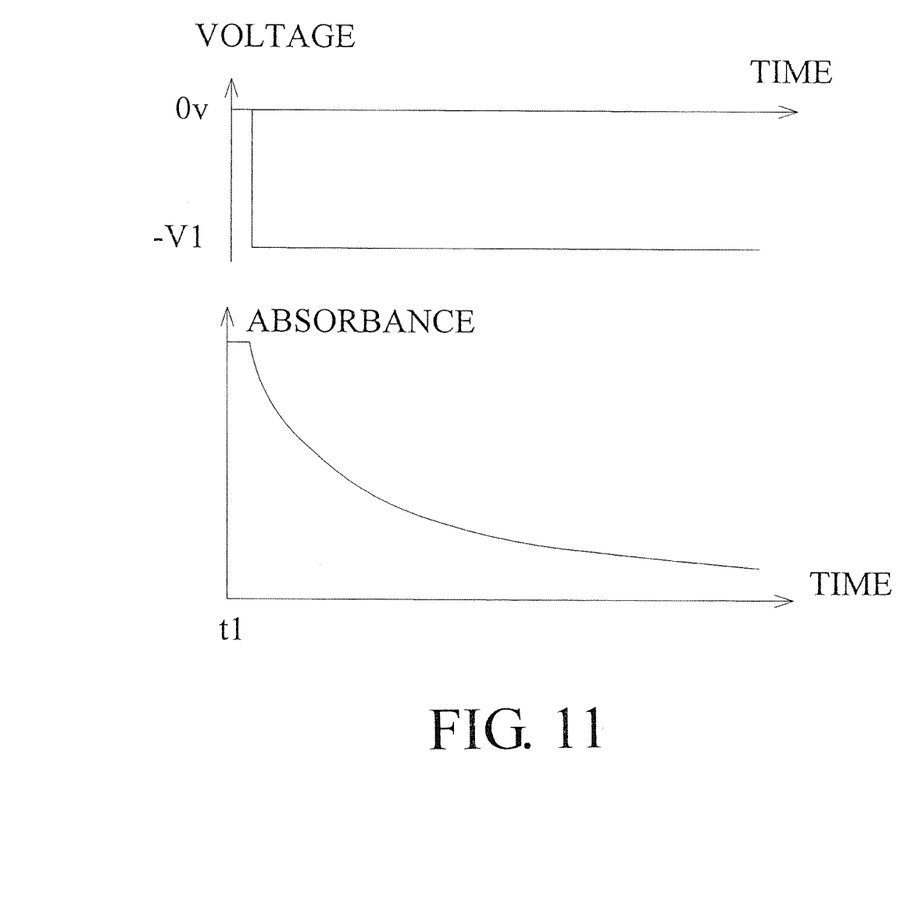
FIG. 11 is a schematic view showing the reduction reaction of an electrochromic element.

In the operation and usage, the transmittance is lowered, the light absorbance is increased and the color becomes darker if a positive electricity is input into the electrochromic element, as depicted in FIG. 10 showing schematically the oxidation reaction of an electrochromic element; on the other hand, the transmittance is increased, the light absorbance is decreased and the color becomes lighter if a negative electricity is input into the electrochromic element, as depicted in FIG. 11 showing schematically the reduction reaction of an electrochromic element. By repeatedly applying positive or negative electricity to an electrochromic element, the electrochromic element can conduct oxidation or reduction reaction so as to reach a desired transmittance.

The above electrochromic element can reach expected effect of adjusting its light transmittance by the change of inputting positive or negative electricity. However, it is found in practical implementation that the magnitude of input voltage and current might affect the rate of change and service life of the electrochromic element. Thus, the abovementioned process of repeatedly applying positive or negative electricity for conducting oxidation or reduction reaction so as to reach desired transmittance takes a long time due to repeated adjustment; and repeated change of voltage and current might cause shrinkage of its service life. Therefore, there are still space for improvement in its overall operation and implementation.

In view of the above facts, the inventor of the present invention hereby proposes a novel transmittance control method of electrochromic element according to the research and improvements conducted on the defects of conventional method, and based on his abundant experience in R&D and manufacturing activities in relevant fields for past many years, so as to achieve the purpose of better practical value.

SUMMARY OF THE INVENTION

The main object of the present invention is to provide a transmittance control method of electrochromic element, in which a fixed total current flux value is input into the electrochromic element so as to reach a transmittance of fixed value as desired. Therefore, the electrochromic element can quickly achieve a transmittance of fixed vale precisely without repeated adjustment. Further, there is not such case happened as to influence the accuracy of its transmittance even after aging time lapse.

The above object and its effect of the transmittance control method of electrochromic element according to the present invention can be achieved by the specific technical means below:

firstly, a total current flux input required is obtained by adding current value of each second together by the relationship between different current value and different rate of change of the electrochromic element obtained in terms of the same transmittance and different input voltages, then the total current flux for fixed transmittance is input into the electrochromic element in usage so as to achieve a transmittance of fixed value.

In a preferred embodiment of transmittance control method of electrochromic element according to the present invention, an attenuation value of the aging degree of an electrochromic element is obtained from its aging phenomena. Then, a stop current flux value for fixed transmittance can be obtained by deducting the attenuation value of the aging degree from the total current flux value. Therefore, the transmittance of the electrochromic element is not affected by the aging phenomena.

The main object and its effect of the transmittance control method of electrochromic element according to the present invention can be achieved by the following specific technical means:

firstly, a total current flux input required is obtained by adding current value of each second together by the relationship between different current value and different rate of change of the electrochromic element obtained in terms of the same transmittance and different input voltages, and the total current flux value is divided by the area of the electrochromic element to obtain a current flux value per unit area of the electrochromic element having desired area. When the electrochromic element is used, the area of the electrochromic element multiplies the above current flux value per unit area of the electrochromic element so as to obtain a total current flux value which is necessary for the electrochromic element to reach the transmittance of fixed value. Therefore, if this total current flux value is input to the specific electrochromic element, a transmittance of fixed value can be easily reached.

In a preferred embodiment of transmittance control method of electrochromic element according to the present invention, an attenuation value of the aging degree of an electrochromic element with certain area is obtained from its aging phenomena. Then, the stop current flux value for fixed transmittance of the electrochromic element with certain area can be obtained by deducting the attenuation value of the aging degree from the total current flux value. Therefore, the transmittance of the electrochromic element is not affected by the aging phenomena.

DETAILED DESCRIPTION OF THE PREFERRED EMBODIMENT

The technical contents, the objects and its effect of the present invention will be further disclosed by the detailed description in conjunction with the accompanying drawings.

Figure 1:
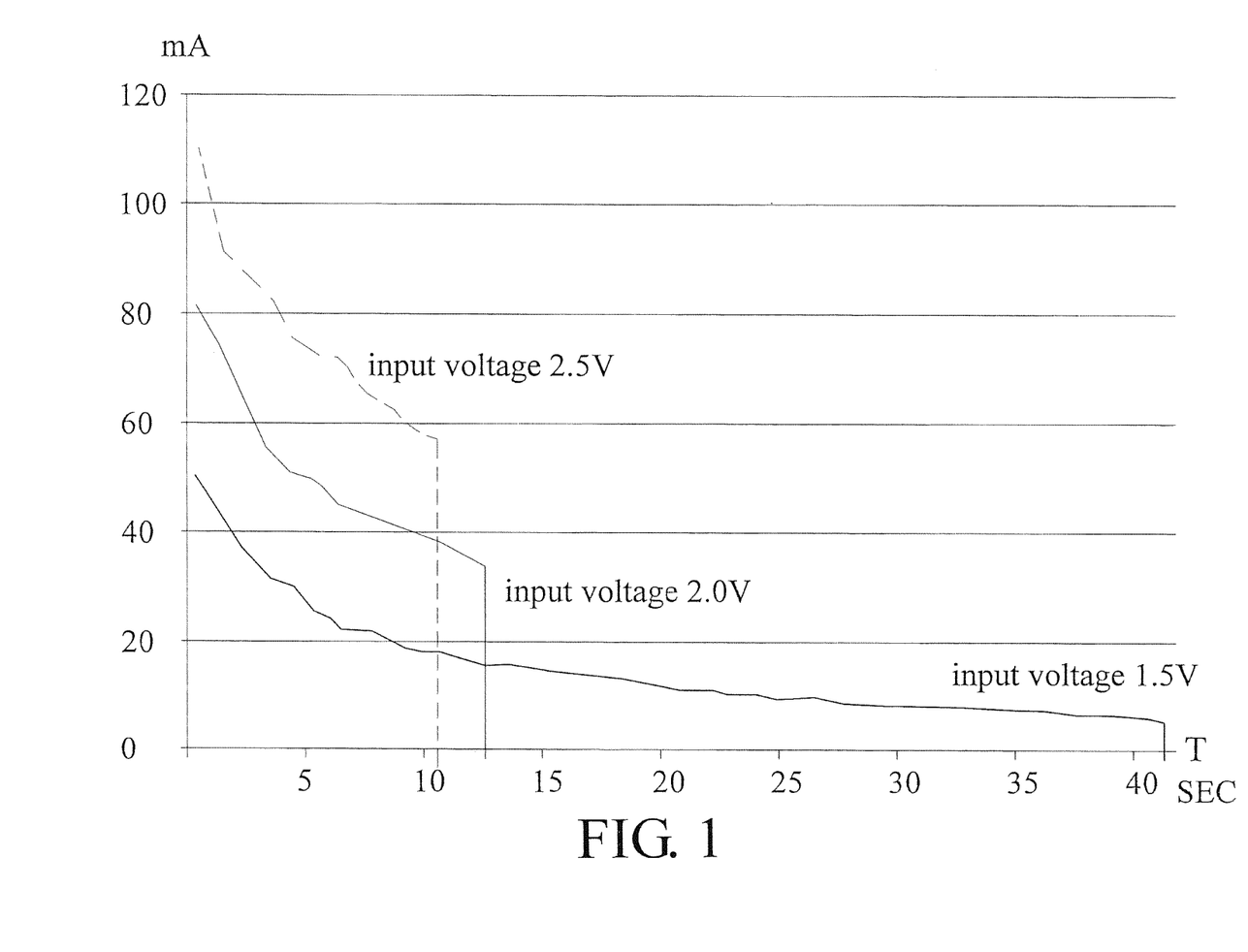
FIG. 1 is a schematic view showing a characteristic curve of an electrochromic element with different input voltages.
Figure 2:
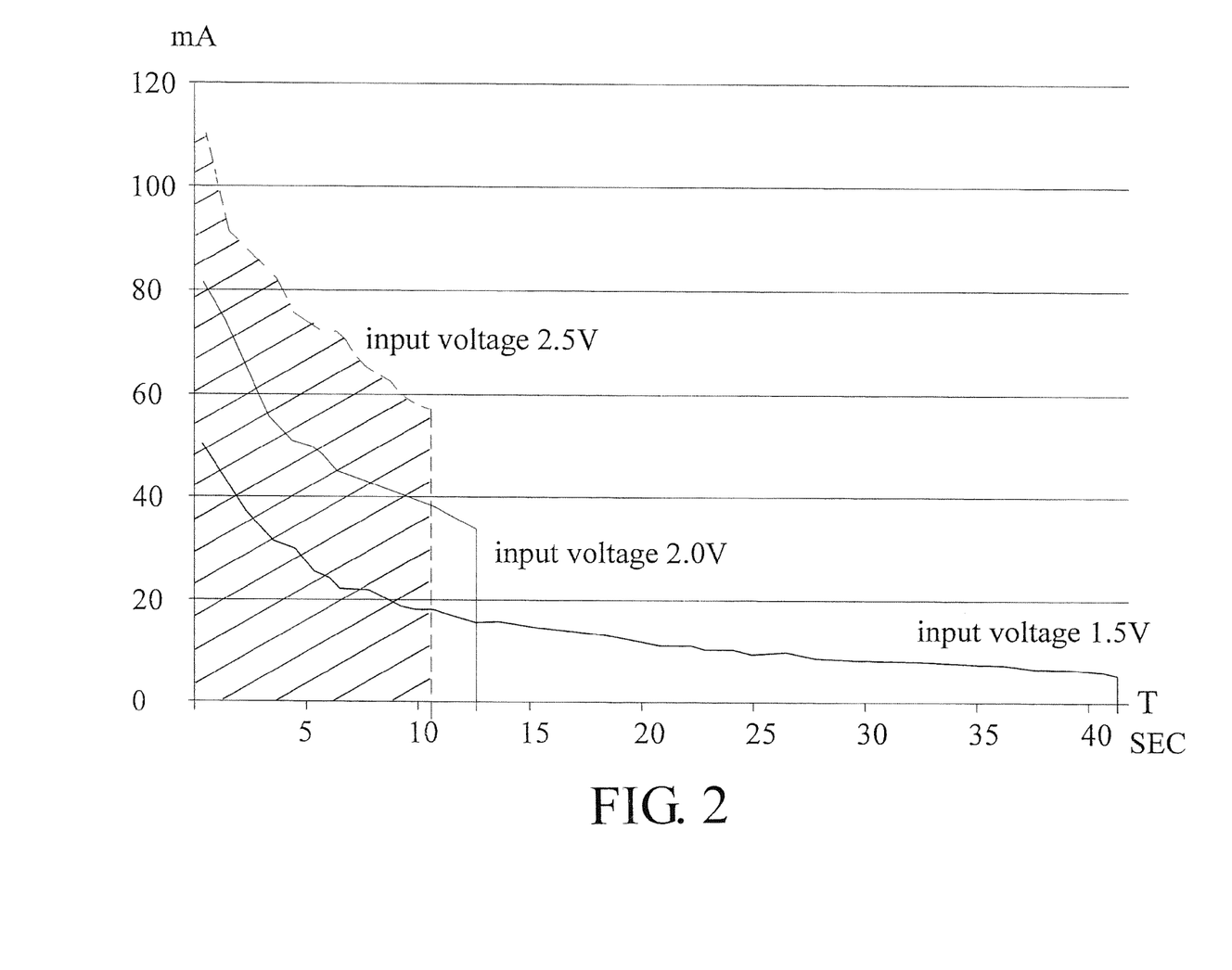
FIG. 2 is a schematic view showing the total current area of an electrochromic element inputted with 2.5V.
Figure 3:
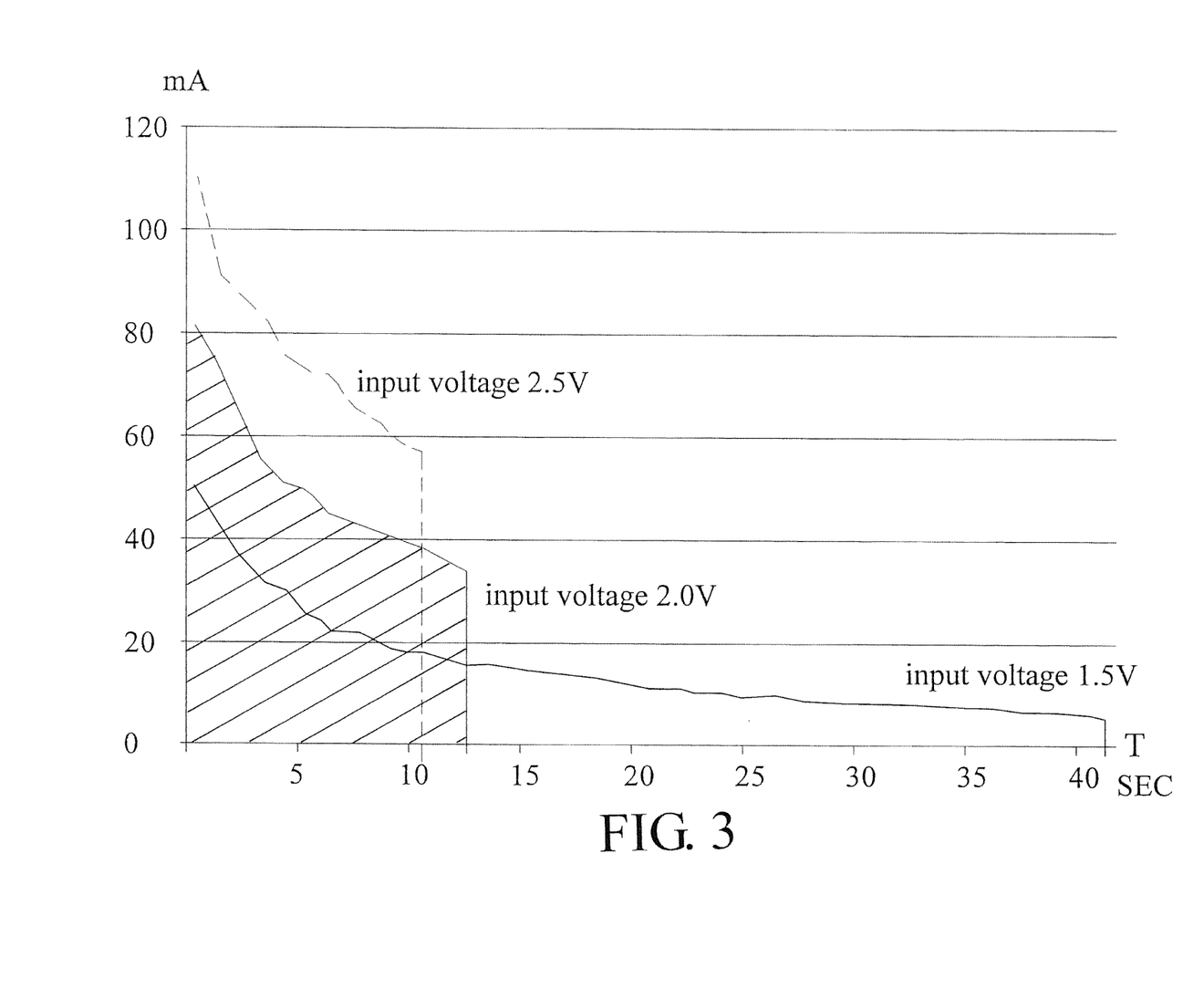
FIG. 3 is a schematic view showing the total current area of an electrochromic element inputted with 2.0V.
Figure 4:
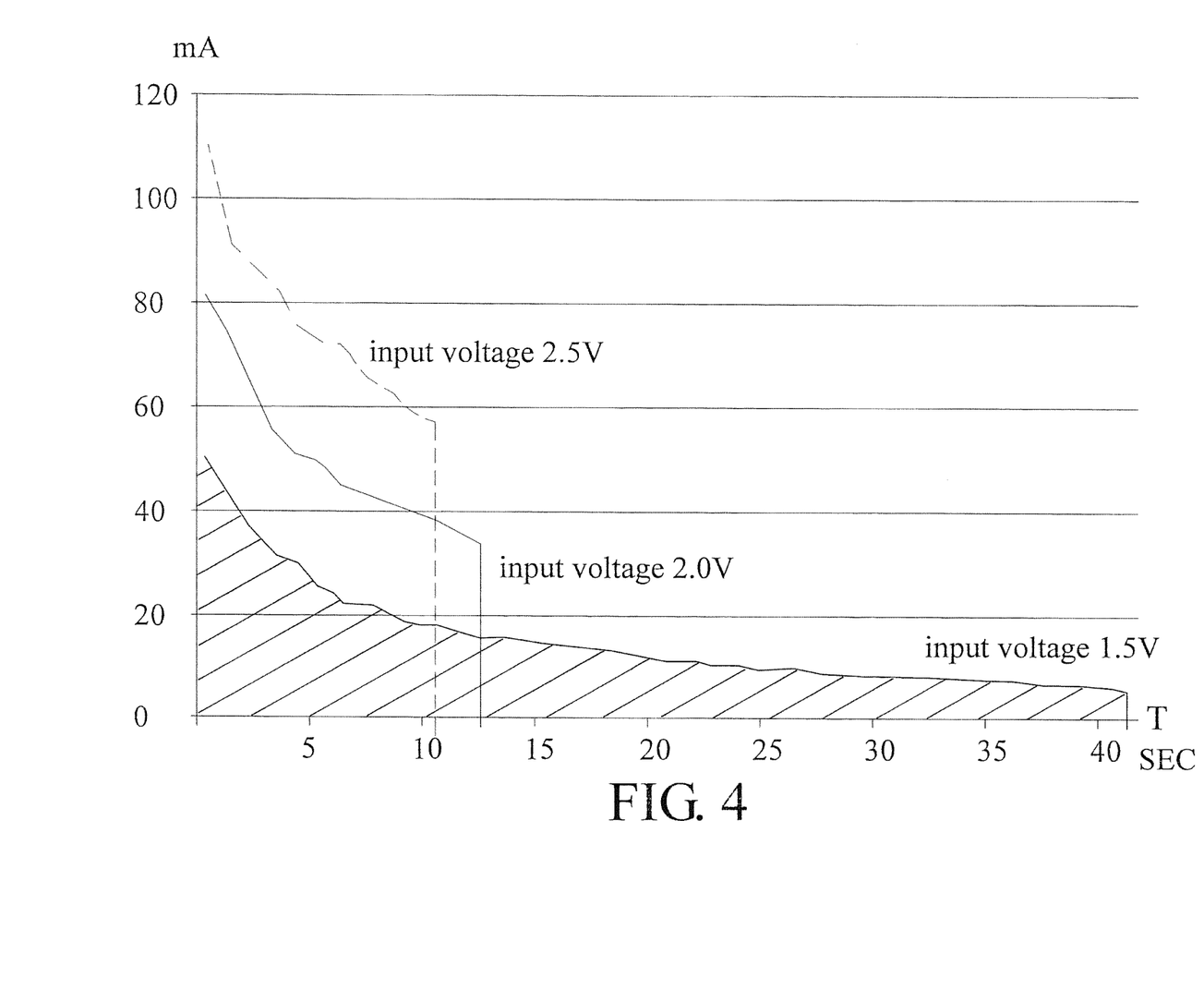
FIG. 4 is a schematic view showing the total current area of an electrochromic element inputted with 1.5V.

FIG. 1 is a schematic view showing a characteristic curve of an electrochromic element inputted with different voltages. As shown in the figure, when outside electricity is input into an electrochromic element to conduct oxidation reaction which causes lowering of transmittance, increase in light absorbance and color change to be darker, if the oxidation reaction is conducted in terms of the same light transmittance, different voltage input will produce different current value and different rate of change. Therefore, the relationship between the current values and the rate of changes in terms of the same transmittance can be obtained from various voltage inputs. Regardless of the input voltage level, the sum of the current value of each second will form the same total current flux value. This can be referred to FIGS. 2 to 4, which are schematic views showing the total current area of an electrochromic element inputted with different voltages 2.5V, 2.0V or 1.5V respectively. For example, the sum of the current value 50 mA of the first second, the current value 45 mA of the 2nd second, the current value 30 mA of the third second, . . . , and the current value of the nth second (desired transmittance reached) is the total current flux value.

Figure 5:
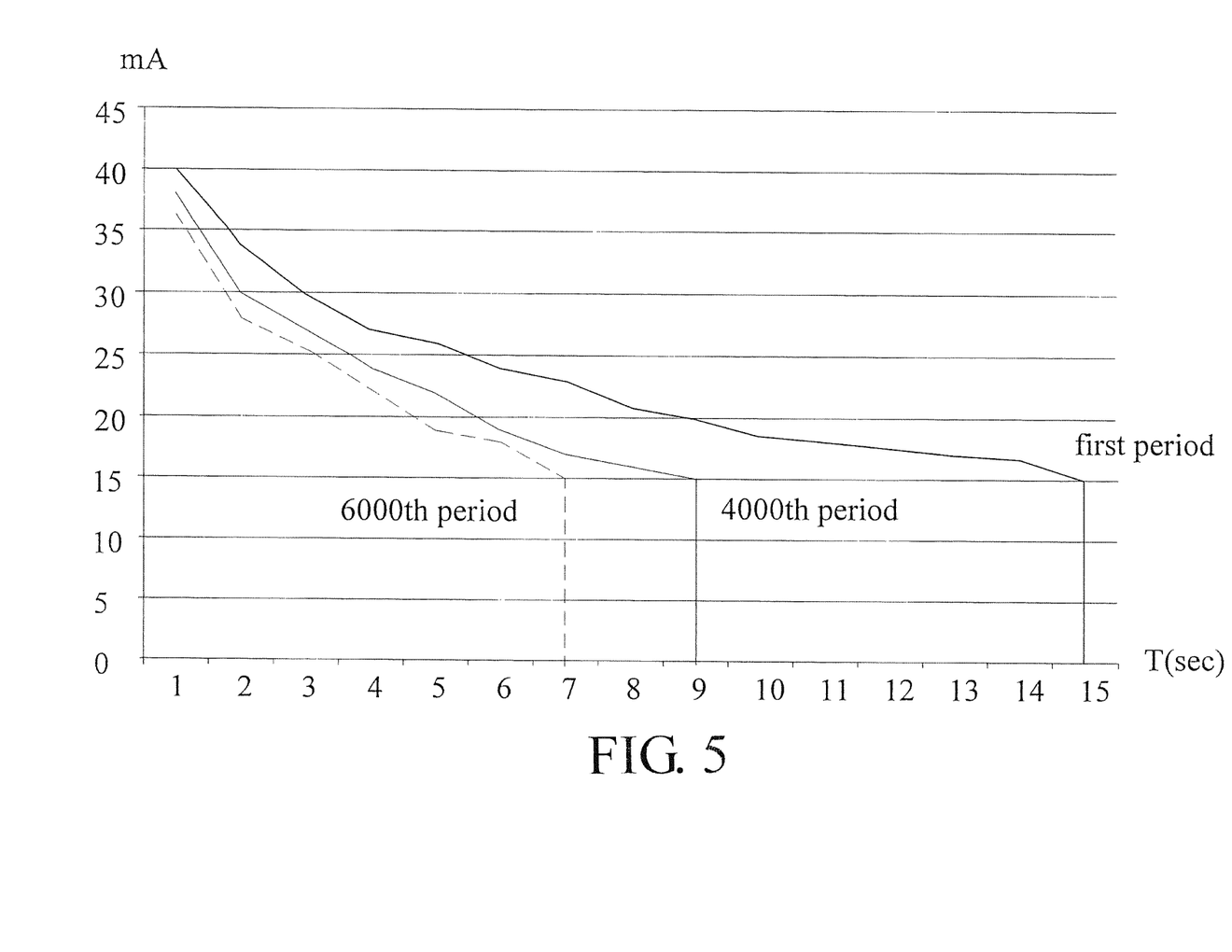
FIG. 5 is a schematic view showing aging phenomena of electrochromic element.

FIG. 5 is a schematic view showing aging phenomena of an electrochromic element. As the electrochromic element has aging phenomena after usage for a period of time, the rate of change of its transmittance under the same input voltage will change in terms of the same current and the same transmittance. For example, the rate of change of the transmittance is getting faster and faster as the first, the $4000^{th}$ and the $6000^{th}$ period goes. If the calculation is still conducted by using the change of rate of transmittance of the first period, the resulting transmittance is not that required.

Figure 6:
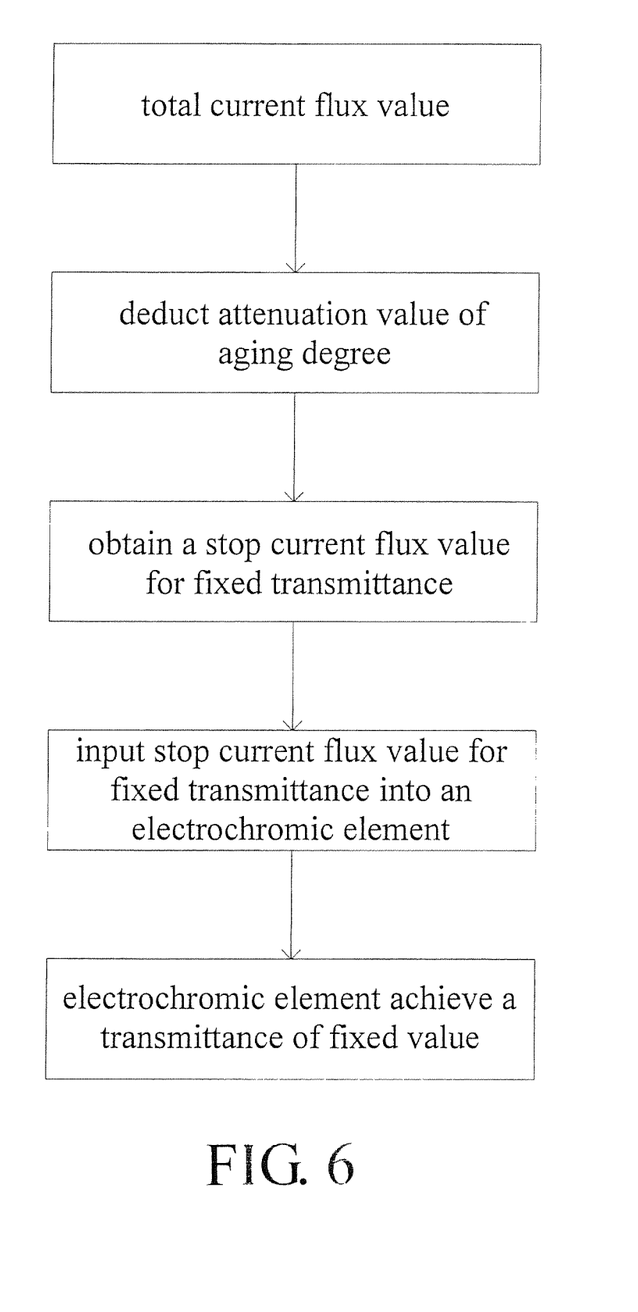
FIG. 6 is a schematic view showing the control steps of the present invention.

FIG. 6 is a schematic view showing the control steps of the present invention. As shown in the figure, firstly, a total current flux input required is obtained by adding current value of each second together by the relationship between different current value and different rate of change of the electrochromic element obtained in terms of the same transmittance and different input voltages. Further, an attenuation value of the aging degree of the electrochromic element is obtained from its aging phenomena. Then, a stop current flux value of the fixed transmittance can be obtained by deducting the attenuation value of the aging degree from the total current flux value. When using the electrochromic element, the stop current flux value of the fixed transmittance is input into the electrochromic element so as to rapidly reach a transmittance of fixed value precisely without repeatedly adjustment. Therefore, the accuracy of the transmittance is not affected by the aging phenomena.

Figure 7:
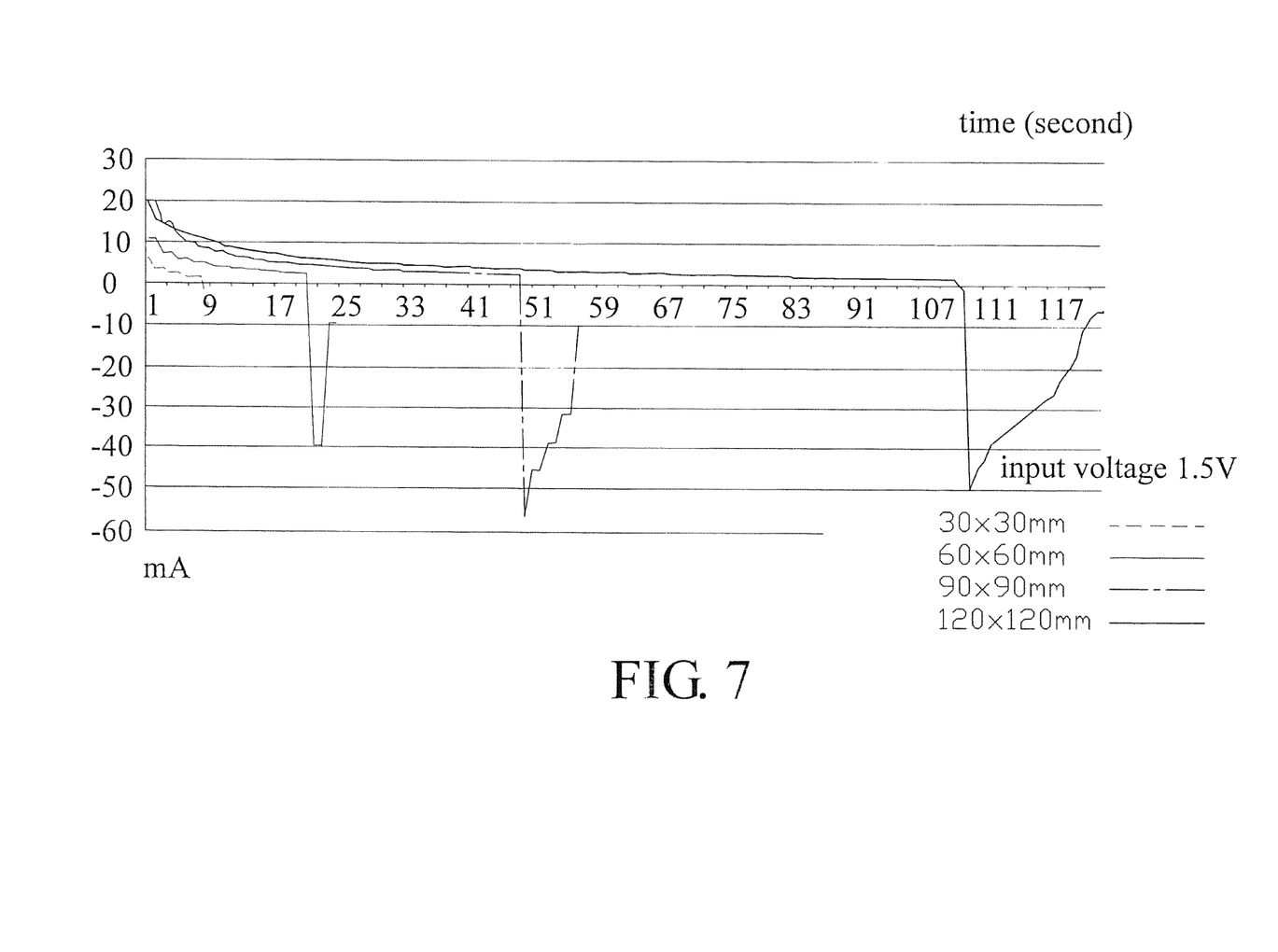
FIG. 7 is a schematic view showing the characteristic curve of electrochromic element with different sizes inputted with a voltage of 1.5V.
Figure 8:
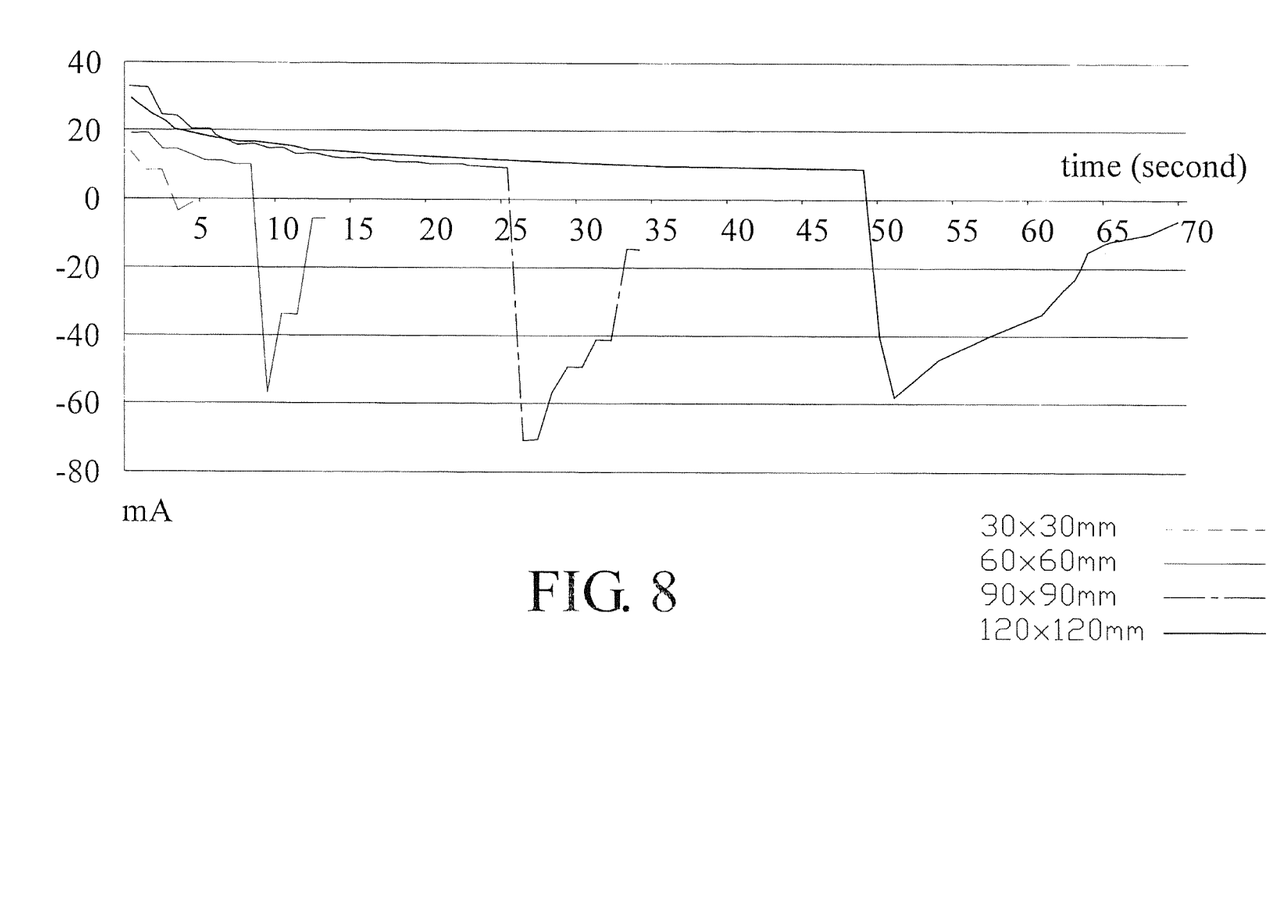
FIG. 8 is a schematic view showing the characteristic curve of electrochromic element with different sizes inputted with a voltage of 2.0V.
Figure 9:
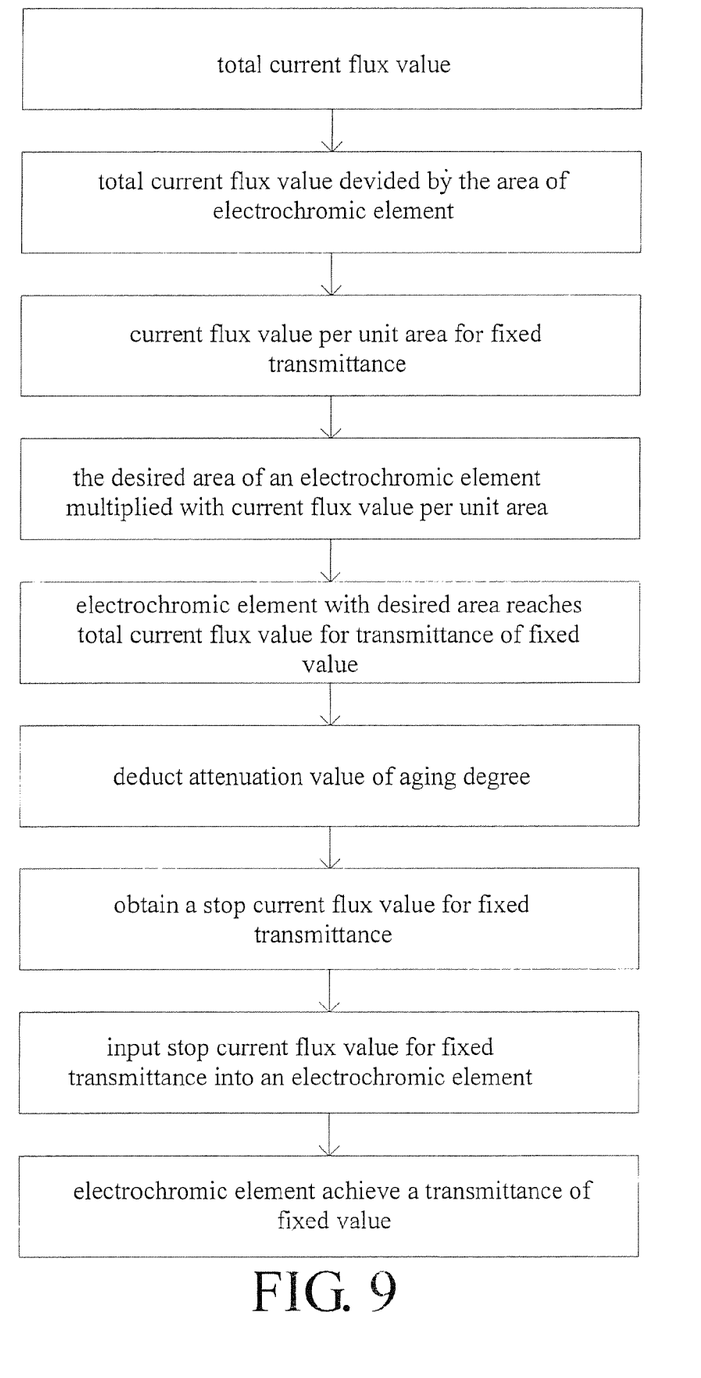
FIG. 9 is a schematic view showing the control steps of another embodiment of the present invention.

FIGS. 7 and 8 are schematic views showing the characteristic curves of an electrochromic element with different input voltages of 1.5V and 2.0V respectively. As shown in the figures, when the electrochromic element with different size is activated in terms of the same transmittance and different input voltages, the total current area capacity obtained from the relationship between different current value and different rate of change is directly proportional to the area. FIG. 9 is a schematic view showing the control steps of another embodiment of the present invention. Firstly, a total current flux input required is obtained by adding current value of each second together by the relationship between different current value and different rate of change of the electrochromic element obtained in terms of the same transmittance and different input voltages. Then, the total current flux value is divided by the area of the electrochromic element to obtain current flux value per unit area of the electrochromic element. When an electrochromic component with a certain different area is used, the area of the electrochromic element multiplies the above current flux value per unit area of the electrochromic element so as to obtain the total current flux value which is necessary for the electrochromic element to reach a transmittance of fixed value. Therefore, if the total current flux value is input to a specific electrochromic element, desired transmittance can be easily reached. Furthermore, attenuation value of the aging degree of the electrochromic element is obtained from its aging phenomena. Further, the stop current flux value of the fixed transmittance of the electrochromic element with desired area can be obtained by deducting the attenuation value of the aging degree from the total current flux value. When using the electrochromic element, the stop current flux value of the fixed transmittance is input into the electrochromic element so as to rapidly reach a transmittance of fixed value in precise manner without repeatedly adjustment. Therefore, the accuracy of the transmittance is not affected by the aging phenomena.

Based on the description of the structural constitutional and implementation stated above, the present invention mainly inputs a total current of fixed value to an electrochromic element so that the electrochromic element can reach desired transmittance of fixed value. Therefore, the electrochromic element can rapidly reach fixed transmittance in precise manner without repeated adjustment. Moreover, there is not such case happened as to influence the accuracy of its transmittance after aging time lapse.

What is claimed is:

1. A transmittance control method of electrochromic element comprising the following steps:
   defining a target transmittance value;
   providing an input voltage and input current to said electrochromic element;
   obtaining a total current flux input required for achieving said target transmittance value by adding each incremental input current value of each second together to determine a relationship between different current values and different rate of changes of said electrochromic element obtained in terms of the same target transmittance value and different input voltages; and
   inputting said total current flux into said electrochromic element so as to achieve a transmittance equal to said target transmittance value.

2. The transmittance control method of electrochromic element as claimed in claim 1, wherein an attenuation value of the aging degree of said electrochromic element is determined after said electrochromic element has degraded after prolonged use, then, a stop current flux value for the target transmittance value is obtained by deducting said attenuation value of the aging degree from said total current flux value, so that the transmittance of said electrochromic element is not affected by prolonged use.

3. A transmittance control method of electrochromic element comprising the following steps:

defining a target transmittance value;

providing an input voltage and input current to said electrochromic element:

obtaining a total current flux input required for achieving said target transmittance value by adding each incremental input current value of each second together to determine a relationship between different current values and different rate of changes of said electrochromic element obtained in terms of the same target transmittance value and different input voltages; and obtaining a current flux value per unit area of said electrochromic element by dividing said total current flux by the area of said electrochromic element; when said electrochromic element is used, the area of said electrochromic element is multiplied to said current flux value per unit area so as to obtain a total current flux value which is necessary for said electrochromic element to achieve the target transmittance value; then, this total current flux value is input to said electrochromic element so as to achieve a transmittance equal to said target transmittance value.

4. The transmittance control method of electrochromic element as claimed in claim 3, wherein an attenuation value of the aging degree of said electrochromic element is determined after said electrochromic element has degraded after prolonged use; then, a stop current flux value for the target transmittance value is obtained by deducting said attenuation value of the aging degree of said electrochromic element with desired area from said total current flux value, so that the transmittance of said electrochromic element is not affected by prolonged use.

* * * * *